Jan. 16, 1934.  W. M. BAILEY  1,943,712
CAPACITOR
Filed Oct. 24, 1929  2 Sheets-Sheet 1

INVENTOR
William M. Bailey
BY
Philip Farnsworth
ATTORNEY

Jan. 16, 1934.    W. M. BAILEY    1,943,712
CAPACITOR
Filed Oct. 24, 1929    2 Sheets-Sheet 2

INVENTOR
William M. Bailey
BY
ATTORNEY

Patented Jan. 16, 1934

1,943,712

UNITED STATES PATENT OFFICE 1,943,712

CAPACITOR

William M. Bailey, Lynn, Mass., assignor, by mesne assignments, to General Electric Company, a corporation of New York Application October 24, 1929. Serial No. 402,164

20 Claims. (Cl. 175—41)

This invention relates to an improved capacitor assembly and more particularly to a novel construction in which the casing is adapted to serve as a combined stack compression and tension member.

The invention is an improvement upon the capacitor assembly shown in the patent to Priess, 1,553,549 filed April 3, 1920.

Hitherto in the manufacture of low capacity condensers, intended for use with currents of relatively high amperage and effective potentials of several thousand volts, it has been the custom to provide metallic casings with open tops or bottoms through which the capacitor unit could be introduced. Such constructions were awkward and required that the capacitor unit be preliminarily assembled and compressed by a separate clamp, the so clamped unit being inserted as an entity into the casing, the appropriate electrical connections being made, and an insulating embedment poured into the casing in and around the unit, after which a cover would be secured in place. Where the casing proper was to be used as a part of the stack compression system, it was necessary to build up the unit within the casing and then apply the requisite compression, usually from one or both ends, after which the finishing steps, such as embedment and fitting of the cover were accomplished. In the instances referred to, the casing required considerable machining in order to assure smooth and aligned bearing surfaces for the end sections. In addition, it was necessary to tap the casing for the screw members required to exert the requisite compression upon the stack.

It is an object of the present invention to provide an improved capacitor assembly which is simple in construction and requires a minimum of machining operations in its manufacture.

It is a further object of this invention to provide an improved capacitor, the several parts of which are so associated, as to permit the ready assembly of a unit, and in which the use of forming jigs and the like may be done away with.

A further object of this invention is the provision of an improved casing and closure member together with a novel high potential terminal construction.

These and other desirable objects and advantages of the present invention will be set forth in the accompanying specification and illustrated in the drawings, certain preferred embodiments being shown and described by way of illustration only, for since the underlying principles may be embodied in other specific mechanical structures, it is not intended to be limited to the ones herein shown, except as such limitations are clearly imposed by the appended claims.

In the drawings, like numerals refer to similar parts throughout the several views, of which Fig. 1 is a top plan view of an improved capacitor;

Figure 1:
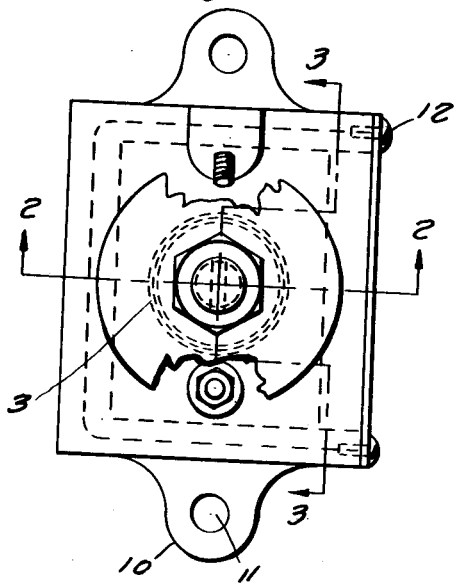
Figure 2:
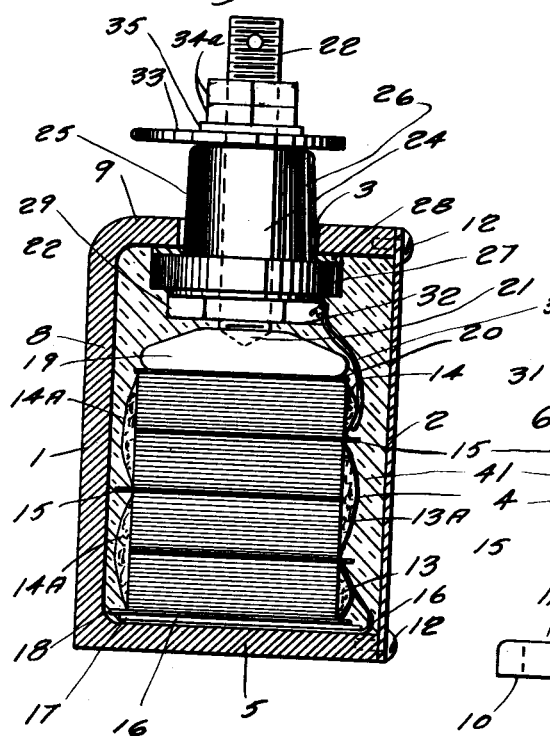
Fig. 2 is a vertical section taken on line 2—2 of Fig. 1, the terminal members being shown in elevation.
Figure 3:
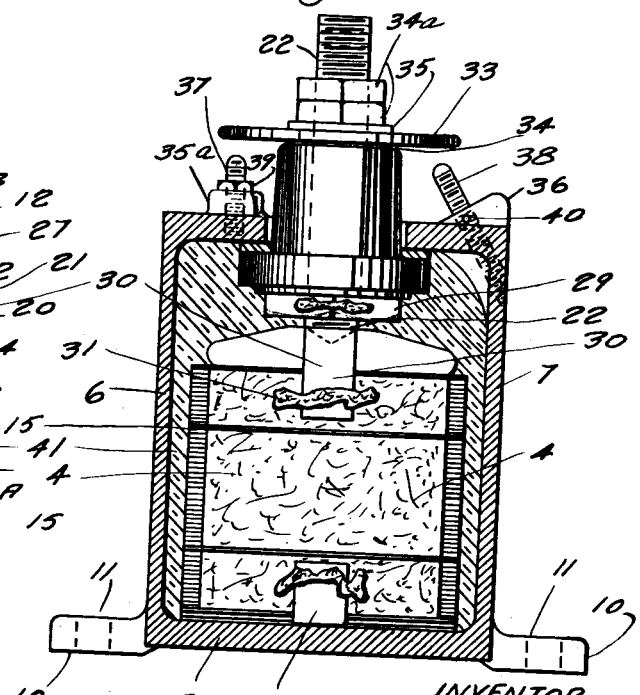
Fig. 3 is a view similar to Fig. 2 taken on line 3—3 of Fig. 1.

The device of the present invention, as shown in Figs. 1, 2 and 3 includes a casing designated generally by the numeral 1, having a cover 2, and a terminal aperture, together with a capacitor unit 4 disposed within the casing in a manner to be described more in detail hereinafter.

The casing includes a bottom portion 5, sides 6 and 7, with a back 8, and a top 9 apertured at 3. The several portions of the casing except cover 2 are shown as integral with one another and the casing may be cast as a unit, or the several parts may be suitably secured together in an appropriate jig and welded to form a unitary structure. The casing and its parts are preferably made of a suitable diamagnetic material such as bronze or the like, to avoid or minimize the effects due to eddy-currents and hysteresis loss when high frequencies are used, as it is well known that under such circumstances a ferrous or other para-magnetic material favors the development of hysteresis, and to a less degree of eddy-currents due to the fields set up about the casing during operation of the devices.

It will be noted that the sides and the top and bottom of the casing form a substantially solid or continuous clamping support for the capacitor unit 4, while securing maximum strength due to the association of the several elements. A study of this construction reveals the fact that the particular association of parts comprehends a plurality of U-clamps which are so connected as to form a series of such members, presenting an unbroken aspect. For example: bottom 5, side 6, and top 9, may be considered as one clamping element, as likewise may the system including the bottom 5, back 8 and top 9, and bottom 5, side 7, and top 9.

The casing may be provided with suitable mounting lugs 10 disposed on either or both sides of the bottom 5, of the casing, and they may be suitably apertured, as shown at 11, to receive any suitable bolt or other appropriate mounting means.

The cover 2 is secured to the open side of the casing in any suitable manner as by threaded screws 12 or equivalent means. The cover, in addition to serving as a closure for the open side of the casing, also subserves the additional useful function of a nameplate, which is adapted to contain appropriate information regarding electrical characteristics as well as the usual patent markings and other indicia. This permits a desirable saving in that it is not necessary to make use of a separate nameplate containing this information and also avoids the necessity of mounting such a nameplate as well as permitting a saving of the labor usually required for such purposes.

Referring more particularly to Figs. 2 and 3, it will be noted that the capacitor body or unit 4 includes a plurality of sections having terminal portions 13 and 14, and intermediate sections having terminal connections designated generally by numerals 13a and 14a, together with suitable insulating separators 15. A terminal strip 16 is disposed on the inside of the bottom of the casing and over it is placed one or more bearing plates 17.

If desired an insulating plate or strip 18 may be placed on top of the bearing plate 17. The member 16 is preferably made of copper or some other relatively soft material, having a high electrical conductivity.

Superposed on the top of the stack assembly is a pressure plate 19 having a bearing surface 20 and an opposed depression 21, adapted to receive an end of a terminal lug 22. The member 22 is adapted to pass through a central aperture 24 in the insulating terminal bushing which has an elongated bushing or shaft portion 25 and an integral bearing shoulder 27. The bushing-portion 25 is fitted through the aperture 3 of the casing-top 9. A washer 28 of lead or other suitable metal is interposed between the shoulder 27 and the casing top 9. A pressure-applying nut 29, usually hexagonal in shape, is fitted over the lower portion of member 22 and is adapted to coact therewith to force the pressure plate 19 into co-operative relationship with the end of stack 4, and also to force the bearing shoulder 27 into cooperative relationship with top 9 of the casing, the lead gasket 28 being compressed and flowed into and around the edge of aperture 3 and completely closing casing-top 9. When the desired capacity of stack 4 has been obtained by appropriately taking up on the locking nut 29 by way of the open side of the casing at right, Fig. 2, then terminal strip 30, which has been previously soldered to the projecting armatures of the top section of the stack, as indicated at 31, is soldered or otherwise secured to the locking nut, as indicated at 32. The other end of the stack is grounded to the metal casing as shown.

It will thus be seen that the compression system of the capacitor assembly comprises, from bottom, the bottom 5 of the casing, the capacitor 4, pressure plate 19, terminal stud 22, locking nut 29 inside the casing, insulating bushing or bridge 25, and the apertured top 9.

Preferably a stack-protecting device is associated with the high potential terminal stud 22. This construction includes an apertured disc or plate 33 of any suitable metal, fitted over the stud and overlying the insulating bushing, a gasket 34, of rubber or lead, as desired, being inserted therebetween to prevent cracking or crazing of the insulating member 25. Member 33 is held in its proper relation to the assembly by means of nuts 34a screwed up on member 22 and the interposed washer 35. Portion 9 of the casing is provided with bosses 35 and 36 which are threaded to receive adjustable spark gap terminals 37 and 38. These terminals may be locked in adjusted position as by a suitable locking nut 39, after the necessary adjustment of the spark gap has been made relative to metal shield 33; or as shown in the alternative construction of member 38, after such adjustment, it may be pinned to member 36 by a suitable pin 40.

In the assembly of the improved capacitor just described, the insulating terminal bushing 25, 27 is introduced through the side of the casing (cover 2 not yet having been applied) and bushing portion 25 is passed up through the aperture 3. Terminal stud 22 then is passed down through the central aperture in the insulating bushing 25, 27 after which pressure-applying device 29 is applied to the lower end of stud 22 projecting from the bottom of 25, 27. Then while parts 29 and 22 are held up with shoulder 27 bearing against the inside of casing-top 9, the unit 4 with its associated terminal strips 16 and 30, and pressure plate 19 are inserted thru the open side of the casing to a position beneath stud 22. Then the parts 29 or 22 are released and allowed to drop down upon pressure-plate 19. The desired stack-pressure is then secured by tightening the stud 22, while holding lock nut 29 as by a wrench extending thru the open side of the casing. When this is completed the nut 29 and stud 22 are drilled and a pin is driven in place, thereby permanently locking the terminal and its associated parts and preventing displacement of the capacitor 4 proper in the casing wherein it is held centrally by the lower end of stud 22. While nut 29 is held from turning by a wrench or spanner, the turning of the top of stud 22 by the pin shown causes the lower end of the stud to be forced below the nut, so that said stud-end enters the central depression formed to receive it in the upper face of pressure-plate 19. Then the continued holding of nut 29 from turning and the continued screwing down of the upper end of stud 22 causes shoulder 27 (which rests on nut 29) ultimately to slide up along stud 22 and abut against the lead gasket on the lower face of casing-top 9. Continuation of said operation compresses the stack and forces the gasket to seal aperture 3, member 27 being moved up along stud 22 and forced up against the gasket. At such time the lateral surface of insulator 25 lies close to the wall of aperture 3, but the sealing is done by the gasket, altho, with fine workmanship the aperture 3 may be closed by 25 also. Compression of stack 4 is commenced also by screwing down of stud 22 from a point above the casing, while nut 29 is held from turning by the wrench extending thru the open side of the casing. The compressions of stack and gasket commence at the same time. During all this time the lower end of stud 22 has been forced further and further below nut 29, even after 29 has stopped moving and lifting member 27. When the stack has been compressed to the desired extent, the wrench on 29 may be withdrawn thru the open side of the casing and cover 2 applied thereto; altho said open side before application of the cover also serves usefully in the introduction into the casing of the insulating filler 41, in addition to the introduction of the wrench into the casing, and parts 25, 27, 17, 18, 19, 14, 4, etc. The top casing-opening 3 is smaller than any of the principal elements inside the casing, bushing-portion 25 (without 27) being the only principal part which is inserted thru the large opening in the side of the casing, which is as small as top opening 3. Aperture 3 necessarily is small enough to provide a bearing portion of casing-top 9 for insulation 27 which is lifted up against 9 by its seat on top of nut 29.

Figure 4:
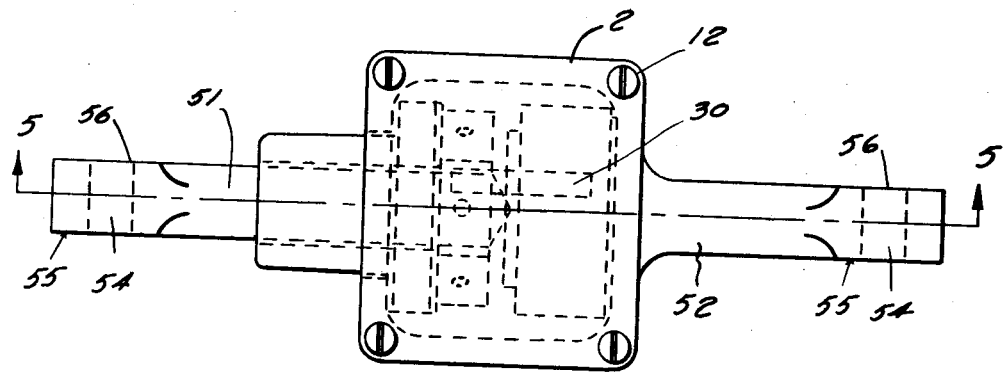
Fig. 4 is a side elevation of a modification of the device shown in Fig. 1, the interior construction being indicated in dotted lines.
Figure 5:
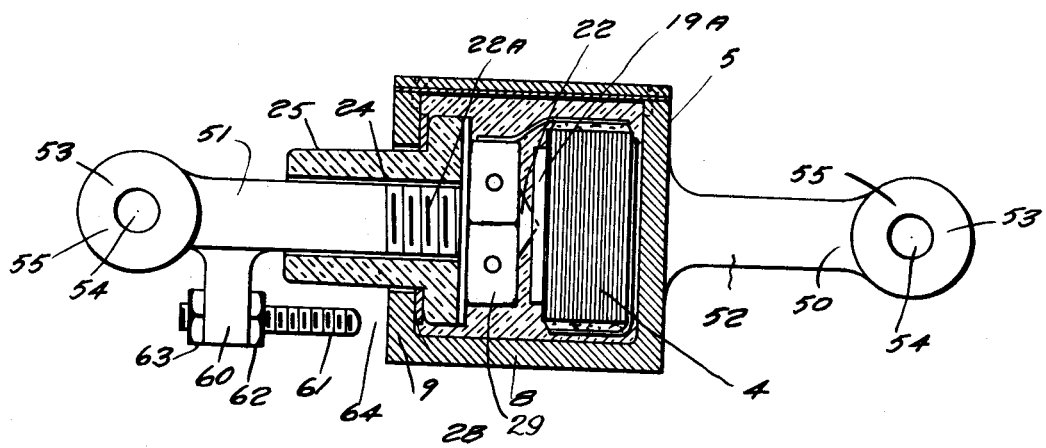
Fig. 5 is a vertical section taken on line 5—5 of Fig. 4.

Among the advantages of the above construction, and the like portion of the modification of Figs. 4-5, are the following, the structure actually being an entirely new type of capacitor. In this type it is made practicable to obtain the desired amount of capacity in the stack inside the casing, without being driven to the necessity of employing a stack characterized by terminal connection to a mid-point of the side of the stack as in the above patent to Priess. In this new type the pressure-stud 22 which causes application of compression to the stack-end, by way of nut 29 and insulating member 27, is the high tension terminal which extends thru and is insulated from the metallic casing-top 9 by bushing 25. This requires that the casing-bottom, (i. e., the casing-wall opposite the wall 9 thru which the high-tension lead 22 extends), shall withstand the stack-compression stress and therefore of course be present at the time of applying the compression, that is, before the embedment of the stack in 41. The arrangement of the casing-wall 9 apertured at 3 for terminal stud-insulator 25, and the insulating member 27 itself, provides for forcing the end of the stack 4 down against the casing-bottom 5 by the upward forcing of nut 29 carrying insulating member 27 up against the portions of casing-wall 9 around aperture 3, as above, such upward trend of shoulder 27 resulting from the downward movement of stud 22 by screwing thru nut 29 while the latter is held from turning by way of access thru the open casing-side. But that construction involves an insulating member 27 larger than circular aperture 31, in order to provide a bearing for member 27; and the stack-compressing operation of parts 22, 29, 27, 9 in the exemplary form requires the holding of nut 29 from turning to which access cannot be had thru either of the two walls of the casing at the ends of the stack. The novel features of this new type of capacitor can be seen by comparison with the construction of the mid-point capacitor of the above Priess patent when the latter is turned ninety degrees so that its sides are at top and bottom, the normal top of a capacitor being the portion from which the circuit-terminal extends. The open side of the present casing is not merely a useful filler-opening, but is provided primarily to make practicable the above construction of casing-top 9 and shouldered bushing 25, 27, i. e., so that the latter can be introduced into the casing so that shoulder 27 can bear upward against the inner side of casing-wall 9. Bushing 25, 27 is of insulating material and it is not practicable, owing to the well-known characteristic of insulating material, to apply the heavy stack-clamping pressure to the stack-ends by providing screw-threads on bushing-portion 25 and on the wall of casing-aperture 3, and then to screw 25 down against the end of the stack. But in the combination of 22, 29, 27 and 9 it is quite practicable, by the relative screw-turning of 22 and 29 to force insulating member 27 resting on 29 up against 9 thereby applying the desired high compression by way of sufficiently thick and strong member 27 as shown without any injury to the insulating material. Insulating member 27 is necessarily of larger diameter than aperture 3, as above, but stack 4 also is usually and preferably much larger than bushing 25, the size of the bushing and aperture being limited by the need of casing-top 9 as an abutment to receive insulating member 27; all so that the leaving open of the casing-side to receive shouldered bushing 25, 27 provides an opening large enough to permit passage of the larger stack and pressure-plate 19. Thus three sides of the metallic casing are left to act as the tension member of the stack-clamping system, and all the advantages in this latter respect of the above Priess type are retained herein while yet there are provided in addition the advantages of dispensing with a design for stack-capacity appropriate to a high tension lead from a mid-point of a side of the stack, so that a wholly advantageous and practicable construction is provided wherein the stud 22 both applies the stack-pressure and constitutes the high tension lead 22 which is insulated from the metallic casing by insulator 27 which itself constitutes an element of the pressure-applying means in a construction which is mechanically and electrically practicable and discounts the innate structural weakness of all insulating materials and their inability to replace metallic elements in various structures particularly when threaded. It is to be noted that member 27 (which is shown as a shoulder of insulating bushing 25 when integral therewith as is preferable) not only is an element of the means for applying stack-compression but is in any case of insulating material, because the screw-threaded parts 22, 29 are of metal and are more or less electrically associated with the high tension lead 22, so that member 27 by which pressure is applied to the stack also insulates the metallic casing from nut 29, etc., and the upper end of the stack, to the lower end of which the casing is connected as a terminal of the capacitor. Thus insulating member 27 lies between metal casing-top 9 and nut 29 and insulates the grounding casing from high tension lead 22 threaded to nut 29, and member 27 so insulating 29 from 9, is forced up against 9 by 29. And this insulating anchorage of 27 on 9 causes the lower end of 22 to become a part of the stack-clamping system in series with the other parts thereof which include nut 29 insulator 27, casing-top 9, the three casing-sides, casing-bottom 5, stack 4 and pressure plate 19 engaged by stud 22.

Thus in the new combination disclosed, including stud 22 and insulating member 27, each of said two parts executes two functions; metallic stud 22 being (1) a terminal lead which extends thru and projects outside of the casing and beyond bushing 25, said terminal being (2) an element of the means for applying mechanical pressure on the stack-end, the exposure of its upper end from bushing 25 making it accessible to be turned for the initiation of stack compression; and insulating member 27 being (1) a means for insulating stud 22 from the metallic casing-top 9 said member 27 being (2) another element of the pressure-applying means; lead 22 being the element of the pressure-applying means by which the pressure is initiated outside the casing by the turning of 22; and insulator 27 being the element of the pressure-applying means by which the pressure is applied to the inner wall of the metallic casing so that the integral sides of the casing are put under tension, and its bottom and top are put under compression, i. e., the wall of the casing thru which terminal lead 22 extends is put under compression by the upward trend of insulator 27 while the neighboring end of the stack is put under compression also but by the downward trend of stud 22 in the direction opposite to the trend of insulator 27; the downward trend of 22 being made possible by the back-stop of insulator 27 against casing-top 9.

All the above is made possible by the provision of nut 29, in combination with stud 22 and insulator 27, the nut supporting said insulator, the insulator and stud 22 being free to slide vertically relative to one another and the nut and the stud being free to move on their screwthreads vertically with respect to one another, all so that there will be the above two results when stud 22 is screwed down, then, while 29 is held stationary by a wrench extending thru the side opening of the casing, and when the lower end of stud 22 has been seated in the top of pressure-plate 19, i. e., said two results being the two movements or trends in opposite directions, of insulator 27 and of the lower end of stud 22; so that after (1) stud 22 has become seated in plate 19 and (2) insulator 22 has become seated against the inside of casing-top 9, then the further stack-clamping operation as above with respect to its initiation by the portion of stud 22 outside the casing and exposed from bushing 25, will cause the sheets of the stack face to face between its two ends to be compressed into conditions of intimate surface contact with one another by the downward screwing of stud 22 against the top of the stack, as if stud 22 were threaded directly thru casing-top 9 save that by the above construction the parts 9 and 22 are insulated from one another. Compression thus will be applied to the stack because the top 9 of the casing and insulator 27 serve as the basis or back-stop from which proceeds the downward movement of stud 22 on the stack-end, as if, as above, the metallic stud were threaded to the metallic top 9 save that said two metallic parts in fact are not in any such or any electrical connection but are insulated from one another by member 27; such insulated condition being attained, in this combination, because the insulator 27 is the means which, instead of the metallic top 9, constitutes the take-off for the downward movement of stud 22, and such take-off is provided because insulator 27 is the means, interposed between stud 22 and top 9, which transmits the compression stress on the top stack-end to the tension element of the stack-clamping system which includes the three sides of the casing which remain after providing the open casing side for the introduction of the insulator 27, nut 29, stack 4, parts 17, 18, 19, 14 and the wrench for holding nut 29 stationary.

The problem which was solved by this new type of capacitor was that of (1) providing for all practical requirements of manufacture and service in (2) a capacitor wherein the stack is in line with the direction of extension of the terminal lead thru the casing and the design of the stack as to the desired capacity is such as not to require a terminal lead connected to a mid-point of the stack intermediate its ends to which ends the stack pressure is initially applied and thereafter maintained.

While it is permissible to process ("wax") the stack while in the casing, it is preferred to carry out the necessary processing before the stack is inserted into the casing. After the stack has been suitably compressed and the necessary final capacity obtained, and before cover 2 is applied to the open side of the casing, the terminal 30 is secured to the nut 29, as indicated at 32, and the static shield 33 and its locking members put in place. Previous to this operation, the casing may be filled around the stack 4 with a suitable embedment 41 of any suitable material, such as wax, pothead or the like, and the cover 2 fastened in position. In addition, the space remaining in the central aperture 24 in the terminal bushing 25, 27 around stud 22 is filled with pothead or any other desirable compound to prevent any ingress of moisture into the casing.

The capacitor assembly just described is particularly suited for general use and, as above noted, is characterized by the simplicity of manufacture and by efficiency in operation.

Where it is desired to use such a construction in transmitting-antenna installations, the invention comprehends the use of a modification of the above described casing which is shown in Figs. 4 and 5. Referring now to these figures, there is shown a casing comprising the general structure above disclosed, with which is associated terminal members 50 and 51. Member 50 is cast integral with section 5 of the casing or otherwise suitably secured thereto. This member comprises a shank portion 52 and an apertured end portion 53 having an aperture 54 and parallel bearing faces 55 and 56. The member 53 is substantially larger than the shank portion 52 and in conjunction with its bearing faces 55 and 56, any suitable bolt and nut construction adapted to pass through aperture 54 may provide a maximum contact surface for an associated conductor, not shown. In addition, the connecting conductor may be applied to the terminal member 53 at any desired angle without involving any departure or change in construction.

Terminal members 51, 55 at the other end of the capacitor assembly are similar to 50, 53 just above described.

Terminal member 51, which is analogous to stud 22 of Figs. 1–3, is provided with a threaded portion 22A and a cone-shaped bearing inner end 22 coacting with bearing plate 19A and is adapted to function in the same manner as the construction described and shown in Figs. 1, 2 and 3. The member 51 is provided with an apertured outer end portion 55 similar in construction and function to member 53 and its associated parts, and in addition is provided with a laterally disposed integral lug 60, which is in turn apertured to receive an adjustable spark gap terminal 61. This terminal is secured to member 60 in any suitable manner as by means of lock nut 62 and 63, and member 61 is adjusted with respect to the opposed surface of portion 9 of the casing to provide a protective spark gap indicated generally at 64.

The internal construction of the casing and the associated capacitor unit in Figs. 4–5 is the same as that above described and the parts have been numbered to correspond therewith. In a construction of this type just described, which is adapted for outdoor operation in a sleet melting circuit and therefore exposed to temperature extremes incident to weather changes, the stack embedding material used at 41, Figs. 1–3, may be pothead or other high melting material instead of wax.

It will now be appreciated that there has been provided an improved capacitor assembly which is adapted for a variety of purposes and which is simple in construction and economical to manufacture. The assembly described permits the securing of a desirable capacity without having to use a mid-point construction as in the above patent to Priess, and thus reduces by one half the assembling and handling of double the number of sections. In addition, the novel construction herein disclosed permits the use of larger stack sections for a given casing size, thus ensuring a maximum space efficiency.

What is claimed is:

1. A condenser structure including a capacitor unit, a casing having an end including an opening, a closed end, two sides fast to the ends and one open side and enclosing the unit, an adjustable screw-threaded member having at least a portion within the casing adapted to retain the unit under compression, an abutment member adapted to have the screw-threaded member insertible thru the open side and having a shoulder adapted to rest on the inside of the end opening to take the thrust of the screw threaded member, and a locking member threaded on the screw-threaded member to take the thrust.

2. A condenser structure including a metallic casing having a closed end, an end including an opening, three closed sides and one open side, a condenser unit within the casing and insertible through the side thereof, a threaded locking member, an abutment member insertible through the open side of the casing and having a shoulder adapted to rest on the inside of the end opening and through which the threaded member passes, and a locking member threaded on the screw-threaded member to take the thrust.

3. A capacitor structure including top, bottom and side members, at least one of said sides being open to form an aperture, a closure member for the aperture, a stack unit disposed in said structure, an insulating bushing mounted on an aperture in the top, and insertible through the side, a combined terminal and stack compression stud disposed in the insulating bushing, an extension of said bushing extending through said aperture, and a locking member on the stud adapted to be screwed against said bushing and force said terminal stud into compressing relation with said stack unit.

4. A capacitor including an integral metallic unitary casing having one end comprising an opening, a closed end, three closed sides and one open side, a non-conducting abutment member having a shaft portion and a bearing shoulder so that the member is adapted to be inserted through the open side and project its shaft through the end opening with its shoulder resting against the inside of the end, a stack of foils and dielectrics adapted to be inserted through the open side, a screw-threaded member adapted to pass through the shaft and compress the stack against the opposite end of the casing, an embedment for the stack, a cover plate for the open side, and an adjustable spark gap from the screw-threaded member to the casing.

5. A capacitor including a metallic unitary casing having one end comprising an opening, a closed end, three closed sides and one open side, a non-conducting abutment member having a shaft portion and a bearing shoulder so that the member is adapted to be inserted through the open side and project its shaft through the end opening with its shoulder resting against the inside of the end, a stack of foils and dielectrics adapted to be inserted through the open side, and a screw-threaded member adapted to pass through the shaft and compress the stack against the opposite end of the casing, a shield on the screw-threaded member adapted to form part of a spark gap and protecting the abutment member, an opposing adjustable terminal on the casing for the other end of the spark gap, and a lock nut adapted to be screwed down on the screw-threaded member to lock it and hold the shield.

6. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; a portion of said stud inside the casing being exteriorly screw-threaded; of a metallic stud-support interiorly threaded to said inside stud-portion; and an insulating back-stop for said stud-support and located between said support and the interior of the neighboring apertured metallic wall of the casing and insulating the stud-support and casing-wall from one another; said insulating back-stop being compressed by said stud-support against the neighboring apertured metallic casing-wall and stopping the stud-support from movement longitudinally of the stud but causing the stud to move longitudinally and apply pressure to the capacitor body compressing it and transmitting stresses from said pressure to the other walls of the metallic casing as tension members of the system which compresses the capacitor body between the stud and the opposite wall of the casing.

7. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; a portion of the stud inside the casing being screw-threaded and the stud being movable inwardly of the casing for the application of such stresses; of a metallic stud-support threaded to said interior stud-portion; and an insulating back-stop for said stud-support and located between said support and the interior of the neighboring apertured metallic wall of the casing.

8. A capacitor including a capacitor body, a metallic casing therefor having integral walls and formed with relatively small and large openings in adjacent walls; the capacitor body being arranged in the casing with its ends facing two opposite casing-walls of which one is the wall formed with said smaller opening as a lead-opening, the side of the capacitor body facing said larger opening in the casing-wall adjacent said two opposite walls; a rigid compressing terminal-stud extending thru said lead-opening and having a threaded portion; an insulating bushing around said stud and extending thru said lead-opening and insulating the stud from the metallic wall of said lead-opening; said bushing being formed integrally with a shoulder lying inside the casing and bridging across the lead-opening; a metallic support inside the casing and threaded to said threaded portion of the stud and supporting the stud for its longitudinal compressing movement, said support also supporting said insulating bushing; and a conducting lead connecting said metallic support to the capacitor body; and the metallic support and bushing being held in operative relation to said apertured casing-wall by the compressing relation of the terminal stud to the end of the capacitor body.

9. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; a portion of said stud inside the casing being screw-threaded; of a metallic stud-support threaded to said interior stud-portion; and an insulating back-stop for said stud-support and located between said support and the neighboring apertured wall of the casing; a portion of the casing near said apertured wall being formed with an opening providing access to said threaded stud-support to hold it from turning with the stud while the stud is being turned to move thru it toward the opposite wall of the casing.

10. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; said stud being movable inwardly of the casing for the application of such stresses; of a metallic stud-support inside the casing supporting the stud movably for its said inward movement in its application of said high stresses compressing the capacitor body; and an insulating back-stop for said stud-support and located between said support and the neighboring metallic wall of the casing and insulating the stud-support and apertured casing-wall from one another; said insulating back-stop being compressed by said stud-support against the neighboring metallic casing-wall and stopping the stud-support from movement longitudinally of the stud but causing the stud to move longitudinally and apply pressure to the capacitor body compressing it and transmitting stresses from said pressure to the other walls of the metallic casing as tension members of the system which compresses the capacitor body between the stud and the opposite wall of the casing.

11. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; said stud being movable inwardly of the casing for the application of such stresses; of stud-cooperating means inside the casing and insulating the stud from the casing and supporting the stud movably for its said inward movement in its application of said high stresses compressing the capacitor body.

12. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; said stud being movable inwardly of the casing for application of such stresses; an insulating bushing around said stud and extending thru said casing-opening and insulating the stud from the metallic wall of said opening; said bushing being formed integrally with a shoulder lying inside the casing and bridging across said opening; and metallic means located between said bushing-shoulder and the neighboring end of the capacitor body and supporting the terminal stud movably for its said inward movement in its application of said high stresses compressing the capacitor body.

13. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; said stud being movable inwardly of the casing for application of such stresses; of stud-cooperating means inside the casing and insulating the stud from the casing and supporting the stud movably for its said inward movement in its application of said high stresses compressing the capacitor body; said metallic casing including walls integral with one another and with said opposite casing-walls and connecting the latter to one another whereby said connecting walls constitute the tension members of the system by which the pressure is applied to the capacitor body, said tension members being integral with said opposite casing-walls between which the capacitor body is compressed; said casing also being formed in said connecting-wall portion with an opening providing for passage therethru of the capacitor body to its said location inside the casing wherein its ends face said opposite walls of the casing including the wall formed with the lead-opening.

14. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; a portion of said stud inside the casing being threaded and the stud being movable inwardly of the casing for the application of such stresses; of a metallic stud-support threaded to said interior stud-portion; and an insulating back-stop for said stud-support and located between said support and the neighboring apertured wall of the casing; a portion of the casing between said opposite casing-walls being open for passage therethru of the capacitor body to its said location inside the casing and for access to said threaded stud-support to hold the latter from turning with said stud while the stud is being turned to move thru its support toward the opposite wall of the casing.

15. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; a portion of said stud inside the casing being threaded and the stud being movable inwardly of the casing for the application of such stresses; of a metallic stud-support threaded to said interior stud-portion; and an insulating back-stop for said stud-support and located between said support and the neighboring apertured wall of the casing and larger than and bridging said opening; a portion of the casing between said opposite walls and near the apertured wall being open for the introduction into the casing of said back-stop and stud-support.

16. In a capacitor of the type including a metallic casing, a capacitor body enclosed thereby and having its ends facing opposite walls of the casing of which one is formed with a relatively small lead-opening, the casing being provided with a larger opening providing for introduction of the capacitor body, the combination with a terminal lead extending longitudinally from the exterior of the casing thru said lead opening toward the neighboring end of the capacitor body for the application of high stresses thereto compressing said body against the opposite casing wall, said stud being movable inwardly of the casing for the application of such stresses; of stud-cooperating means inside the casing and supporting the stud movably for its pressure application and insulating the stud from the casing.

17. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; a portion of said stud inside the casing being threaded and the stud being movable inwardly of the casing for the application of such stresses; of a metallic stud-support in threaded relation to said interior portion of the stud and means insulating it from the metallic casing; a portion of the casing between said opposite casing walls and near the apertured wall being open for access to said threaded stud-support during the application of pressure by the stud.

18. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; said stud being movable inwardly of the casing for application of such stresses and a portion of the stud inside the casing being threaded; an insulating bushing around said stud and extending thru said casing opening and insulating the stud from the metallic wall of said opening; said bushing being formed with a shoulder lying inside the casing and larger than the opening and bridging the opening; and a metallic stud-support threaded to said interior portion of the stud and located between said bushing shoulder and the neighboring end of the capacitor body and supporting the stud movably for its said inward compressing movement; said metallic casing including walls integral with one another and with said opposite casing-walls and connecting the latter to one another whereby said connecting walls constitute the tension member of the compression-applying means, said tension member being integral with said opposite casing-walls between which the capacitor body is compressed; and casing being formed in said connecting-wall portion with an opening providing for passage therethru of the capacitor body, said shouldered bushing and said stud-support, said opening also providing for access to said threaded stud-support during the application of pressure by the stud.

19. In a capacitor of the type including a metallic casing having integral walls and formed with a lead-opening, and an enclosed capacitor body having its ends facing two integral casing-walls in one of which said lead-opening is formed, the improvement which includes a terminal lead extending thru said lead-opening and having the form of a rigid stud extending longitudinally toward the neighboring end of the enclosed capacitor body for the application of high mechanical compressing stresses thereto acting against the opposite integral casing wall, said stud being longitudinally movable for the application of such stresses; of means supporting the stud in compressing relation to the end of the capacitor body, insulating it from the apertured casing-wall and connecting it to the capacitor body; a portion of the casing between said opposite walls being open for the passage of the condenser body; and a cover for said opening secured to the metallic casing.

20. In a capacitor of the type including a metallic casing, a capacitor body enclosed thereby and having its ends facing opposite walls of the casing of which one is formed with a relatively small lead-opening, the combination with a terminal lead in the form of a rigid compressing stud extending longitudinally from the exterior of the casing thru said lead-opening toward the neighboring end of the capacitor body for the application of high stresses thereto compressing said body against the opposite casing-wall; a portion of the stud inside the casing being threaded and the stud being movable inwardly of the casing for the application of such stresses; of a metallic stud-support threaded to said interior portion of the stud and means insulating it from the apertured casing-wall; and a connecting lead between said threaded stud-support and the capacitor body.

WILLIAM M. BAILEY.